(12) United States Patent
Schmidt et al.

(10) Patent No.: US 7,009,144 B2
(45) Date of Patent: Mar. 7, 2006

(54) PROCESS FOR SHORT-TIME ARC WELDING AND SHORT-TIME ARC WELDING SYSTEM

(75) Inventors: Wolfgang Schmidt, Reiskirchen (DE); Klaus G. Schmitt, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/763,124

(22) Filed: Jan. 22, 2004

(65) Prior Publication Data

US 2004/0182828 A1 Sep. 23, 2004

Related U.S. Application Data

(63) Continuation of application No. PCT/EP02/08149, filed on Jul. 22, 2002.

(30) Foreign Application Priority Data

Jul. 23, 2001 (DE) ................. 101 36 992

(51) Int. Cl.
B23K 9/20 (2006.01)
(52) U.S. Cl. .............. 219/130.01; 219/98; 219/99
(58) Field of Classification Search .............. 219/98, 219/99, 130.01; 228/103
See application file for complete search history.

(56) References Cited

U.S. PATENT DOCUMENTS

| 4,267,426 A * | 5/1981 | Mallett ............... 219/98 |
| 4,605,836 A * | 8/1986 | Retfalvi et al. ........ 219/130.01 |
| 4,721,947 A * | 1/1988 | Brown ................ 228/103 |
| 5,434,382 A | 7/1995 | Schlattl et al. |
| 5,449,877 A | 9/1995 | Buda et al. |
| 5,662,820 A | 9/1997 | Schwiete et al. |
| 5,676,867 A | 10/1997 | Van Allen |
| 5,977,506 A | 11/1999 | von Daniken |
| 6,225,590 B1 | 5/2001 | Farrow |
| 6,271,500 B1 * | 8/2001 | Hirayama et al. ..... 219/130.01 |
| 6,660,965 B1 | 12/2003 | Simpson |

FOREIGN PATENT DOCUMENTS

WO   WO 96/10468   4/1996

OTHER PUBLICATIONS

International Search Report for PCT/EP02/08149, dated Dec. 12, 2002, 6 pages.
Neue Tucker Technologie. Bolzenschweißen mit System!, dated Sep. 1999 (Brochure in German with translation brochure attached).

* cited by examiner

Primary Examiner—Clifford C. Shaw
(74) Attorney, Agent, or Firm—Harness, Dickey & Pierce, P.L.C.

(57) ABSTRACT

A process and a system are proposed for short-time arc welding, in particular for stud welding, with the step of sampling a welding parameter, in particular the arc voltage (U), during at least one time segment ($T_s$) of the welding operation, in order to detect disturbances, wherein the measurement curve determined from the sampling operation is smoothed and subsequently wherein at least one tolerance curve is generated which lies at a previously adjustable distance from the smoothed measurement curve, and subsequently the unsmoothed measurement curve is compared with the tolerance curve in order to detect high-frequency disturbances.

43 Claims, 1 Drawing Sheet

PROCESS FOR SHORT-TIME ARC WELDING AND SHORT-TIME ARC WELDING SYSTEM

CROSS-REFERENCE TO RELATED APPLICATIONS

This application is a continuation of PCT application PCT/EP02/08149, filed on Jul. 22, 2002, which claims priority to German application no. DE 101 36 922.1, filed on Jul. 23, 2001, both of which are incorporated by reference herein.

BACKGROUND AND SUMMARY OF THE INVENTION

The present invention relates to a process for short-time arc welding, in particular stud welding, with the step of sampling a welding parameter, in particular arc voltage, during at least one time segment of the welding operation, in order to detect disturbances.

Further, the present invention relates to a short-time arc welding system for welding elements, such as for example metal studs, on to components, such as for example metal sheets, with a welding head device which raises an element in the context of a welding operation in relation to the component and lowers said element again, a power supply device which provides the power for forming an arc between the component and the raised element, a measuring device which samples at least one welding parameter, in particular the arc voltage, during at least one time segment within the welding operation, and an analysis device to which the sampled measurements of the welding parameter are fed in order to detect disturbances.

The said process of short-time arc welding or short-time arc welding system is generally known. Short-time arc welding is frequently referred to as stud welding although it is not studs that are welded. A current system of stud welding in industrial use is known from the brochure "Neue TUCKER-Technologie. Bolzenschweißen mit System!" ["New TUCKER technology. The stud welding system!"], published by Emhart TUCKER in September 1999. Stud welding is carried out mainly, but not exclusively, in automotive engineering wherein metal elements such as metal studs with or without a thread, eyes, nuts, etc. are welded on to the metal sheet of the vehicle's body. The metal elements then serve as anchors or mounting elements in order, for example, to fix interior trim elements.

In the case of the above cited stud welding according to TUCKER, initially an element is placed in a welding head. This can take place by means of an automatic feed device, for example by means of compressed air. The welding head then positions the element at the appropriate point on the component. Next a pre-welding current is switched on which flows through the stud and the component. The element is then raised in relation to the component. An arc forms. The arc flow is selected such that initially contaminants, surface coatings, zinc, dry-film lubricants, oils, etc. are burned off or evaporated. The current then switches to a welding current. As a result of the high welding current the mutually opposing end faces of the element and component melt. The element is then lowered again on to the component so the mutual melts are mixed. The welding current is switched off when the component is reached and the arc short-circuits. The melt solidifies and the weld joint is complete.

In industrial use in particular it is usual to monitor one or more welding parameters. Particularly in the automotive industry, with the high productivity and the high numbers of articles produced, as close as possible to a one hundred per cent quality control is almost essential. As a rule, however, the quality achieved by a weld joint cannot be detected with sufficient certainty by visual inspection of the weld joint and therefore it is usual to sample at least one welding parameter, for example the arc voltage, during at least one time segment within the welding operation in order to detect disturbances. The arc voltage in particular is an important parameter for the weld joint quality ultimately achieved. Also the synchronization of the arc voltage with the lifting movement of the metal element is an important decision criterion for assessing welding quality.

In the prior art it is usual to compare arc voltage, lifting movement of the element and/or welding current directly with an upper or a lower tolerance threshold in order to evaluate the welding operation. However, it has been found that the above described monitoring of welding parameters is not always sufficient to achieve a good agreement between the evaluation of the particular welding process and the welding result actually achieved. Against this background it is the object of the present invention to indicate a process of short-time arc welding or a short-time arc welding system wherein monitoring of welding parameters will allow detection, with even greater certainty, of whether the quality of the respective welding operation was or was not satisfactory.

This object is achieved in the case of the process of short-time arc welding mentioned at the outset in that the measurement curve determined from the sampling operation is smoothed and subsequently at least one tolerance curve is generated which has a previously adjustable distance from the smoothed measurement curve, and that subsequently the unsmoothed measurement curve is compared with the tolerance curve in order to detect high-frequency disturbances. In the short-time arc welding system mentioned at the outset this object is achieved, in that the analysis device is designed to smooth a measurement curve determined from the sampled measurements of the welding parameter and subsequently to generate at least one tolerance curve which has a previously adjustable distance from the smoothed measurement curve and is designed subsequently to compare the unsmoothed measurement curve with the tolerance curve in order to detect high-frequency disturbances.

By means of the arc welding process or arc welding system according to the invention the welding parameter monitoring can be optimized in order to increase the welding quality of short-time arc weld joints. It was found that the following problems can occur when welding aluminum studs in particular. Owing to the low viscosity of the aluminum melt, the metal element may occasionally drip on to the metal component. Further it can occur that gas shielding of the arc is disturbed owing to external circumstances. This results in the arc being fed oxygen from the air. These disturbances affect the arc voltage. A dripping of aluminum melt leads to a short-term drop in the arc voltage (drop). A breach of the gas shielding leads to a short-term rise in the arc voltage (peak). Such high-frequency disturbances could not be detected with previous approaches to monitoring of the welding parameters.

By means of the process or system according to the invention it is possible to detect these high-frequency disturbances of the arc voltage. Consequently suitable measures can be taken, for example emitting an alarm, incrementing an error counter, etc. Owing to the fact that the tolerance curves are based on the smoothed measurement curve, low-frequency changes in the arc voltage are not evaluated as disturbances. Such low-frequency changes in the arc voltage can emerge for example in the course of regulation operations affecting the arc voltage and consequently will not be evaluated in the present connection as disturbances.

To describe the invention in general reference is made hereinafter to the arc voltage as the welding parameter. The arc voltage is, as mentioned hereinbefore, an especially relevant parameter for the quality of the welding operation. However, it is understood that all references to the arc voltage are to be understood, also alternatively and/or cumulatively, as references to other welding parameters such as the welding current, the stud path, etc. The segment during which the welding parameter is sampled can either cover the entire time span of the welding operation or only a segment thereof. For example, the sampling segment can start only with the reaching of a certain lifting height, and can be terminated prior to the complete lowering of the element on to the component. The object is consequently fully achieved.

In a preferred embodiment the tolerance curve is arranged above the smoothed measurement curve in order to detect high-frequency disturbances which protrude upwards (peaks) in relation to the smoothed measurement curve. In a further embodiment which can be used alternatively or cumulatively for this, the tolerance curve is arranged below the smoothed measurement curve in order to detect high-frequency disturbances which protrude downwards (drops) in relation to the smoothed measurement curve. As a result of the possibility of detecting peaks, short-term disturbances of the gas shielding of the arc can be detected, in particular during welding of aluminum studs. As a result of the possibility of detecting drops, bridging of the arc owing to dripping melt can be detected, in particular when welding aluminum. Both types of disturbance can lead to welding results which are deficient in terms of quality. Consequently, owing to the detection of the peaks or drops, an error signal can be emitted. On this basis either reworking can take place, or the entire welding operation can be repeated. Altogether it is also an advantage if the distance between the tolerance curve and the smoothed measurement curve is constant across the sampling segment. In general it is also conceivable to vary the distance over time, but a constant distance is sufficient for error detection and can also be programmed comparatively easily in terms of software.

According to a further preferred embodiment, after smoothing the measurement curve at least two tolerance curves are generated which curves show two different distances in relation to the smoothed measurement curve in the same direction, and the unsmoothed measurement curve is subsequently compared with the two tolerance curves in order to detect less strong and strong high-frequency disturbances.

By providing two tolerance curves it is possible to differentiate between strong and less strong high-frequency fluctuations of the welding parameter. This can, for example, be used in order, on detection of strong high-frequency disturbances, to emit an immediate error signal. By contrast, if a detected disturbance is less strong, in other words it exceeds the more proximate tolerance curve, but the more distant tolerance curve is not exceeded, a fault counter can be incremented for instance. Only on exceeding a certain number of such less strong disturbances will an error signal then be emitted. Further it is of advantage when the welding parameter is sampled discreetly. Discrete measurements can be processed especially favorably in digital signal processing. In this respect it is also of advantage if the measurement curve is smoothed by means of digital low-pass filtering of the measurement curve which consists of discrete measuring points. Digital low-pass filtering may for example be achieved in a digital signal processor in the form of an FIR filter.

Altogether it is of advantage if the sampling period lies in the region of between 100 $\mu$s and 1,000 $\mu$s, in particular in the region between 200 $\mu$s and 500 $\mu$s. It has been shown that such a sampling period is more than adequate to detect high-frequency disturbances, as they can occur in the form of peaks and drops. It is furthermore of particular advantage if low-pass filtering takes place with a limit frequency in the region of between 20 Hz and 400 Hz, in particular in the region of between 50 Hz and 250 Hz. Altogether it is of advantage if the frequency of occurrence of high-frequency disturbances is detected. In this manner it is possible to detect the tendency of high-frequency disturbances such as peaks or drops to occur. For example, with progressive operating life of the welding system permanent changes in the welding conditions can occur. This may be detected by detecting the frequency of occurrence of high-frequency disturbances.

In a further preferred embodiment, the electrical current used to generate the arc is regulated to a constant value during a sampling segment and the arc voltage is integrated over time in order to obtain a measure for the energy which is applied to the weld joint. This embodiment is viewed as a separate invention independently of the possibility according to the invention of detecting high-frequency disturbances by means of measurement curve smoothing, tolerance curve generation and curve comparison.

It has been shown, namely, that the energy input into the weld joint is also an important parameter for evaluating the quality of the weld joint. The energy can simply be calculated as a comparison by integrating the arc voltage. Since the welding current remains constant owing to the regulation, the integral of the arc voltage is directly proportionate to the energy which is applied. Here it is particularly preferred if the energy determined by integrating the arc voltage is compared with an upper and/or a lower threshold value in order to assess the quality of the weld joint. If the energy input is below the lower threshold value, possibly insufficient material has been melted in order to achieve a good quality weld joint.

By contrast, if the input energy quantity exceeds the upper threshold value, probably too much energy has been input so that there is a danger that the component and/or the element has suffered damage. In the case of the welding of studs on to very thin body panels in particular, this is an important decision criterion for assessing the quality of the weld joint. In the short-time arc welding system according to the invention, it is of particular advantage if the power supply device is a constant-current source.

In this embodiment it may be assumed in respect of the question of monitoring and analyzing the measurements obtained that the welding current is constant. Consequently it is possible during monitoring to concentrate on other welding parameters such as in particular arc voltage, in order to be able to assess the quality of the weld joint. The monitoring and analysis of the welding operation as a rule takes place such that initially the welding parameter or welding parameters are sampled across the entire sampling segment. Subsequently by means of the sampled and stored measurement curve an assessment is made of the welding operation that has taken place. Only in a normal pre-current phase wherein an arc is drawn, is it also possible additionally to carry out real-time monitoring and to abort the welding operation even before switching on the actual welding current in case an error occurs which the system cannot itself compensate for. For the element and component are not yet melted by the pre-current so it is still possible to abort the welding operation and to repeat it at the same point, if necessary.

It is understood that the preceding named features and the features still to be described hereinafter can be used not only in the respectively indicated combination but also in other combinations or in isolation, without going beyond the scope of the present invention.

BRIEF DESCRIPTION OF THE DRAWINGS

Embodiments of the invention are shown in the drawing and are explained in greater detail in the description hereinafter.

DETAILED DESCRIPTION OF THE INVENTION

Figure 1:
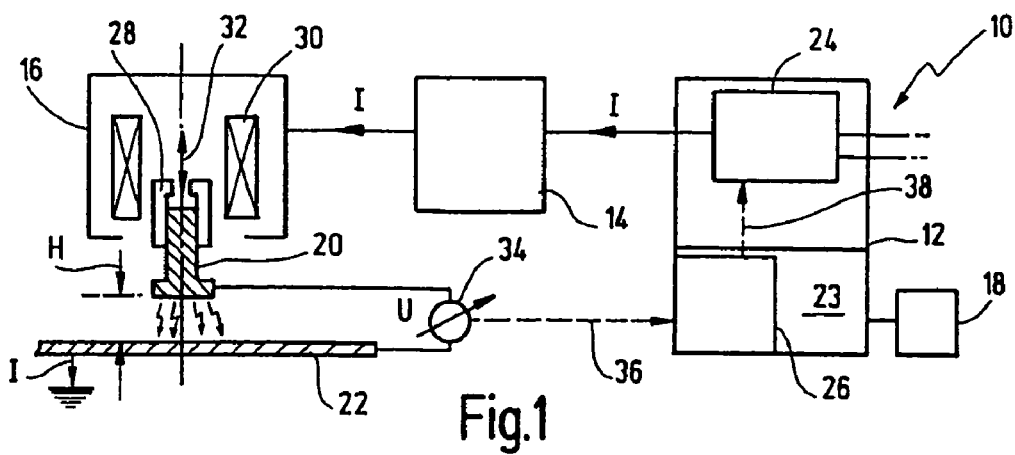
FIG. 1 shows a schematic representation of a short-time arc welding system according to the invention.

In FIG. 1 a short-time arc welding system according to the invention is generally referred to by 10. The welding system 10 has a control and energy unit 12. A plurality of feed units 14 can be connected to the control and energy unit 12, of which a feed unit 14 is represented in FIG. 1. To each feed unit 14 one or two welding heads 16 are connected, the drawing in FIG. 1 showing a single welding head 16. Furthermore, a user interface 18 is provided on the control and energy unit 12 via which user interface 18 a user can configure the welding system 10. Further system data, alarms, etc. can be displayed on a display at the user interface 18.

The welding system 10 serves to weld metal elements such as metal studs 20 on to metal components such as metal sheets 22. A typical field of use is automotive engineering. Here the welding system 10, or a plurality of such welding systems 10, serves or serve to weld joint elements such as metal studs with or without a thread, eyes, nuts, etc. to vehicle body components. The joint elements serve as anchors to mount, for example, interior trims in the motor vehicle.

The control and energy unit 12 contains a control device 23 and a power supply device 24. The control device 23 in turn contains an analysis device 26. The control device 23 serves in general to control the welding system 10. It is directly connected to the user interface 18 so various welding parameters, basic programs for controlling welding sequences, etc. can be loaded. The power supply device 24 is a constant-current source in design. It provides a regulated constant current I which is fed to the welding head 16 via the feed unit 14. The welding current I then flows through the metal element 20 and the metal component 22.

The welding head 16 has a holder 28 which holds a metal element 20 to be welded on. Further the welding head 16 contains an electric linear motor 30 by means of which the holder 28 together with the metal element 20 can be raised and lowered, as is shown schematically at 32. Instead of an electric linear motor 30, the welding head can also contain a combination of an electromagnet and a counter spring which spring presses the metal element 20 against the metal component 22. Such a welding system 10 is basically known from the prior art and is described in greater detail in the brochure "Neue TUCKER-Technologie. Bolzenschweißen mit System!" ["New TUCKER technology mentioned at the outset. The stud welding system!"], the disclosure of which is fully implicit by reference thereto.

In general, a welding operation with the welding system 10 takes place as follows. Initially the element 12 is placed on to the component 14 such that an electrical contact occurs. A so-called pre-current is then switched on. Shortly thereafter the element or metal element 20 is raised in relation to the component or metal component 22 until a welding lift height is reached. During this time the pre-current remains switched on. During the raising of the component an arc is drawn. The pre-current arc has sufficient energy in order to burn off or evaporate any contaminants, surface coatings, zinc, dry-film lubricants, oils, etc. in the region of the welding point. After reaching the welding lift height, the welding current I is brought into circuit. As a result of the high welding current I of approximately 20 A to 1,500 A, for example, the element 20 and the component 22 are melted in the region of the drawn arc. The arc is indicated diagrammatically in FIG. 1 by a plurality of arrows between the element 20 and the component 22.

The energy E flowing into the welding operation increases. Subsequently the lowering operation is initiated. The element 20 is lowered at a predetermined speed until it impinges on the component 22. At this point in time the arc is short-circuited and the welding current I is switched off wherein the lowering operation can take place until slightly below the base face of the metal component 22 in order to guarantee a saturated immersion of the element 20 into the melted surface of the component 22. The melts of the element 20 and the component 22 unite and cool down owing to the interruption in the energy input. The element 20 is thus welded firmly on to the component 22 and can serve as an anchor to fix parts to the component 22.

For monitoring a welding operation the welding system 10 has a measuring device 34 which measures the electrical arc voltage U occurring between the element 20 and the component 22 during the welding operation. The measuring device 34 transmits the measurements via a signal line 36 to the analysis device 26 of the control device 23. The analysis device 26 evaluates the course of the arc voltage U during a welding operation. The results of the analysis are stored in a memory of the control device 23 and/or displayed via the user interface 18. The analysis device 26 is further connected via a signal line 38 to the power supply device 24. Via the signal line 38 the power supply device 24 can be instructed, at least during the pre-current phase, to abort a welding operation in case a disturbance is detected in real time by means of the arc voltage. However, usually the measurements of the measuring device 34 are stored, as stated, in the control device 23 (or the analysis device 26) and analyzed after completion of the welding operation.

Figure 2:
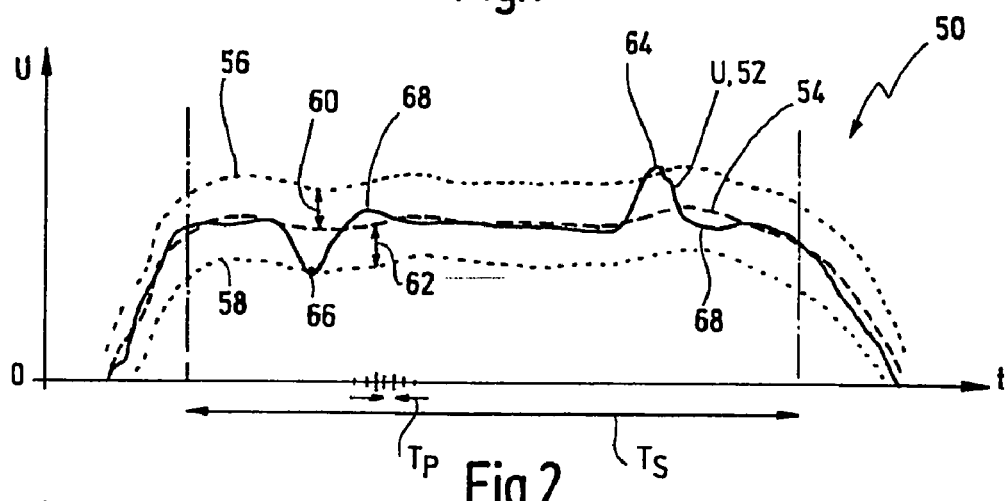
FIG. 2 shows a graph of the arc voltage over time to explain the process of short-time arc welding according to the invention.

FIG. 2 shows a graph 50 of the arc voltage U over time. The course of the arc voltage U during a welding operation is displayed at 52 wherein the arc voltage is initially zero, i.e. when the metal element 20 comes into direct contact with the metal component 22. With the raising of the metal element 20 in relation to metal component 22 the arc voltage U rises until a certain level is reached. This level is maintained approximately throughout a welding segment $T_s$ and then falls again. At the moment where the metal element 20 again comes into contact with the metal component 22, the arc voltage U is again zero. During the welding operation the arc voltage U is sampled discretely, with a sampling period $T_p$, which can last, for example, for 256 µs. The total welding operation can last for a duration of, for example, in the region of 6 to 200 ms.

The measurement curve 52 of the arc voltage U sampled during a welding operation can be compared with, for example, a fixed, previously set threshold value (not shown). Further it is possible to form a mean value of the arc voltage U over time wherein it is possible to limit it to the welding segment $T_s$. Subsequently an analysis is possible by comparison of the measurement curve 52 with the mean. According to the invention however, the measurement curve 52 is smoothed initially, for example by means of low-pass filtering. The smoothed measurement curve is represented in FIG. 2 by a broken line and designated by the reference number 54. Low-pass filtering can take place, for example, by digital signal processing on a digital signal processor of the control device 23 by means of known algorithms, for example by an FIR filter.

The limit frequency of the low-pass filter is 125 Hz for a welding time $T_s$ lasting, for example, 100 ms. This means approximately that the measurement curve 54 contains no frequency components with a frequency greater than 125 Hz (corresponding to a period of 8 ms). Subsequently an upper tolerance curve 56 and a lower tolerance curve 58 are calculated with reference to the smoothed measurement curve 54. The upper tolerance curve 56 maintains a constant distance 60 from the smoothed measurement curve 54 throughout the period. Similarly, the lower tolerance curve 58 maintains a constant distance 62 from the smoothed measurement curve 54 throughout the period.

In the analysis device 26 the unsmoothed measurement curve 52 is subsequently compared with both the upper and the lower tolerance curve 56, 58. It is shown that the unsmoothed measurement curve 54 has an outlier upwards (peak) 64 which lies outside the upper tolerance curve 56. Similarly, the unsmoothed measurement curve 52 has an outlier downwards (drop) 66 wherein the arc voltage U is below the lower tolerance curve 58. On the other hand, the unsmoothed measurement curve 52 also has a plurality of other overshoots 68 wherein the unsmoothed measurement curve 52 deviates in relation to the smoothed measurement curve 54, but respectively remains inside the tolerance curves 56, 58. The analysis device 26 consequently detects the peak 64 and the drop 66 as high-frequency disturbances of the arc voltage U. These disturbances are stored in the control device 23 and/or are displayed via the user interface 18. An alarm can optionally be triggered to the effect that the welding operation superimposed by high-frequency disturbances has been deficient and requires reworking or a new weld. On the other hand, it is also possible to document the occurrence of such high-frequency disturbances by incrementing an error counter, and only emitting an alarm on exceeding a certain threshold of the error counter.

Figure 3:
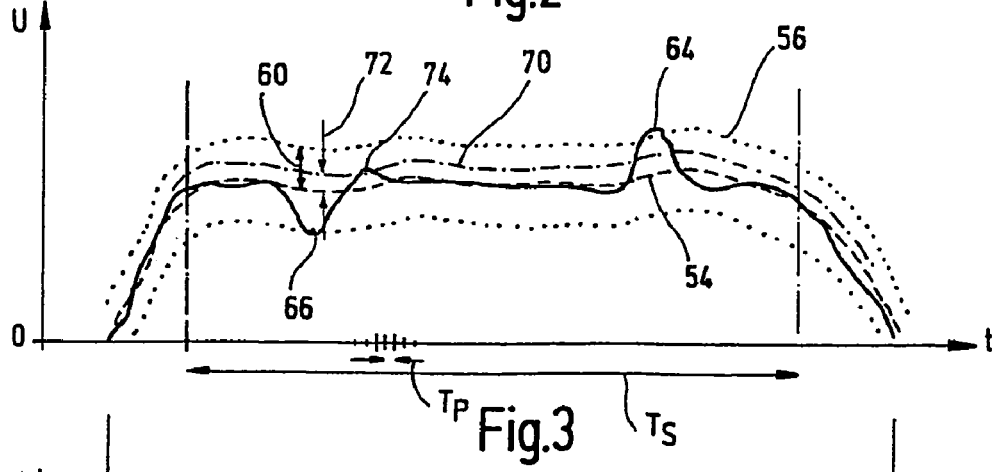
FIG. 3 shows a view similar to FIG. 2 of a further embodiment of the process of short-time arc welding according to the invention.

FIG. 3 shows a diagram of arc voltage U over time t corresponding to FIG. 2. All the explanations hereinbefore consequently relate also to the embodiment in FIG. 3. In this embodiment, besides the upper tolerance curve 56, an intermediate tolerance curve 70 is calculated. The intermediate tolerance curve 70 has in relation to the smoothed measurement curve 54 throughout a constant distance 72 which is less than the distance 60, for example by half.

After a welding operation the unsmoothed measurement curve 52 on the one hand is compared with the upper and lower tolerance curve 56, 58. It is determined that a great high-frequency disturbance exists when one of these two tolerance curves 56, 58 is exceeded, as is the case in the peak 64 and the drop 66. In the case of such a great high-frequency disturbance occurring, in this embodiment an alarm signal is emitted in any case, which indicates via the user interface 18 that the welding operation was deficient and requires reworking.

In contrast, if high-frequency disturbances occur which, although remaining inside the tolerance curves 56, 58, still exceed the intermediate tolerance curve 70, as is shown in FIG. 3 at 74, the analysis device 26 interprets this as a less strong high-frequency disturbance. The analysis device 26 consequently does not emit an alarm signal, but only a warning signal. The warning signal can be used to increment an error counter, for example.

If the occurrence of such warnings based on less strong high-frequency disturbances increases, a tendency can be deduced indicating that the welding system 10 must be serviced, or other boundary conditions have changed which negatively affect the welding operation permanently. A peak like the above depicted peak 64 can in particular occur when in the course of a welding operation for various reasons a gas shield around the arc is disturbed. This results in oxygen being fed to the arc. The electrical resistance and consequently the arc voltage U rise.

Correspondingly, a drop like the above drop 66 can be elicited by the dripping of low-viscosity melt either from the metal element 20 or the metal component 22 (depending on the relative positions). Such short-term dripping results in a reduction in electrical resistance and consequently a decrease in the arc voltage U. It has been shown that the frequency of the disturbances elicited thereby lies in the region of >250 Hz. Such disturbances cannot be determined by means of conventional monitoring processes, in particular not when the arc voltage is regulated, for example by changing the lifting height H. Further it can be determined that the above named disturbances can occur in particular when aluminum studs or other aluminum elements are welded on to aluminum.

Figure 4:
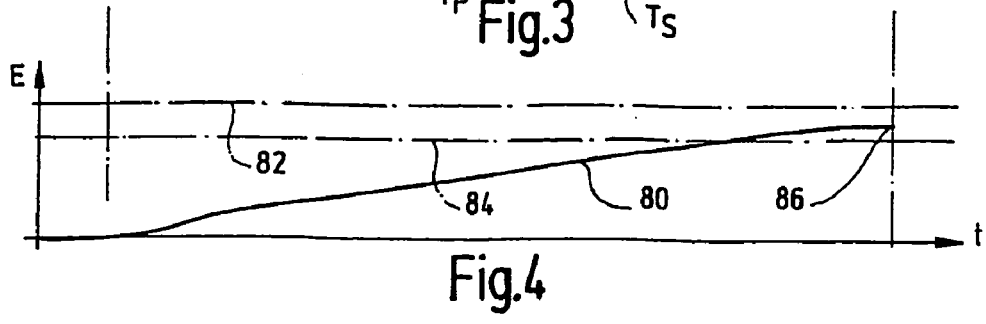
FIG. 4 shows a graph of the energy input into a weld joint over time to illustrate a further aspect of the present invention.

FIG. 4 shows a graph of the energy E input into the weld joint over time t. The value of E is determined by integrating the arc voltage U over time. Consequently the value of E increases continuously, but with a variable gradient, until the end of the welding operation. The corresponding curve is represented in FIG. 4 by 80. At the end of the welding operation a final value of the energy E is consequently reached, which is shown by 86 in FIG. 4.

In FIG. 4 furthermore an upper threshold value 82 and a lower threshold value 84 are inscribed for the final value of the energy E. The upper and the lower threshold value 82, 84 are input beforehand. These values are calculated on the basis of experience. If the final value 86 of the energy E is lower than the lower threshold value 84, the energy input E into the weld joint is too low for the element 20 to be capable of use as a permanent support. Conversely, when the upper threshold value 82 is exceeded by the final value 86 it is assumed that the energy input E was too high. Consequently there is a danger that zones in the neighborhood of the weld joint have also been affected and/or undesired deformations of element 20 or component 22 have occurred. If, in contrast, the final value 86 lies between the upper and the lower threshold values 82, 84, the analysis device 26 will evaluate the welding operation as good in respect of the input of energy which has taken place.

It is understood that integration of the arc voltage U to determine the energy input E can also be performed by digital means by using a digital signal processor.

What is claimed is:

1. A process for determining the quality of a weld, the process comprising:
    (a) measuring a welding parameter over a specified time;
    (b) generating a measurement curve from the measuring;
    (c) smoothing the measurement curve;
    (d) creating a tolerance curve based on a smoothed measurement curve;
    (e) determining a difference between the tolerance curve and the measurement curve; and
    (f) evaluating the weld quality based on the difference.

2. The process of claim 1, wherein the specified time is between about 100 µs and 1000 µs.

3. The process of claim 1, wherein the specified time is between about 200 µs and 500 µs.

4. The process of claim 1, further comprising comparing the measurement curve to the tolerance curve to determine a disturbance.

5. The process of claim 4, further comprising evaluating the disturbance to determine weld quality.

6. The process of claim 4, wherein the disturbance is a high frequency disturbance.

7. The process of claim 1, further comprising smoothing the measurement curve by means of a low pass filter.

8. The process of claim 7, wherein the filter has a band pass between about 20 Hz and about 400 Hz.

9. The process of claim 7, wherein the filter has a band pass between about 50 Hz and about 250 Hz.

10. The process of claim 1, further comprising generating at least one of the tolerance curves above and below the measurement curve.

11. The process of claim 1, further comprising generating feedback based on the evaluating the weld quality.

12. A welding method for welding an element to a component using a feed unit and a welding head, the method comprising:
    (a) feeding the element from the feed unit to the welding head;
    (b) energizing the welding head;
    (c) welding the element to the component;
    (d) measuring a welding parameter during welding;
    (e) generating a measurement curve from the measuring;
    (f) smoothing the measurement curve;
    (g) creating a tolerance curve based on a smoothed measurement curve;
    (h) determining a difference between the tolerance curve and the measurement curve; and
    (i) evaluating the weld quality based on the difference.

13. The process of claim 12, wherein the measuring a welding parameter during welding is over a specified time.

14. The method of claim 13, wherein the specified time is between about 100 µs and 1000 µs.

15. The method of claim 14, wherein the specified time is between about 200 µs and 500 µs.

16. The method of claim 13, further comprising comparing the measurement curve to the tolerance curve to determine disturbances.

17. The method of claim 16, further comprising evaluating the disturbance to determine weld quality.

18. The method of claim 17, wherein the disturbance is a high frequency disturbance.

19. The method of claim 12, further comprising smoothing the measurement curve by means of a low pass filter.

20. The method of claim 19, wherein the filter has a band pass between about 20 Hz and about 400 Hz.

21. The method of claim 19, wherein the filter has a band pass between about 50 Hz and about 250 Hz.

22. The method of claim 12, further comprising generating tolerance curves above and below the smoothed measurement curve.

23. The method of claim 12, wherein the parameter is arc voltage.

24. The method of claim 12, further comprising generating feedback based on the evaluating the weld quality.

25. A welding method for welding an element to a component using a feed unit and a welding head and ensuring weld quality, the method comprising:
    (a) feeding the element from the feed unit to the welding head;
    (b) lifting the element to a height along a substantially linear path in relation to the component;
    (c) energizing the welding head;
    (d) welding the element to the component;
    (e) measuring a welding parameter during welding for a specified time;
    (f) generating a measurement curve;
    (g) smoothing the measurement curve using a low pass filter creating a smoothed measurement curve;
    (h) creating a tolerance curve based on a specified tolerance above and below the smoothed measurement curve;
    (i) sensing a difference between the tolerance curve and the measurement curve;
    (j) evaluating the weld quality based on the difference;
    (k) retracting the element in relation to the component; and
    (l) stopping energy to the welding head.

26. The method of claim 25 further comprising comparing the measurement curve to the tolerance curve to determine disturbance.

27. The method of claim 26, further comprising evaluating the disturbance to determine weld quality.

28. The method of claim 26, wherein the disturbance is a high frequency disturbance.

29. The method of claim 25, further comprising smoothing the measurement curve by means of a low pass filter.

30. The method of claim 29, wherein the filter has a band pass between about 20 Hz and about 400 Hz.

31. The method of claim 29, wherein the filter has a band pass between about 50 Hz and about 250 Hz.

32. The method of claim 29, wherein the specified time is between about 200 µs and 500 µs.

33. The method of claim 25, wherein the specified time is between about 100 µs and 1000 µs.

34. The method of claim 25, wherein the parameter is arc voltage.

35. A welding system for welding an element to a component, the system comprising:
    (a) a welding head operably initially moving the element in relation to the component and later returning the element;
    (b) a measurer operable measuring at least one welding parameter;
    (c) a power supply operably providing power for creating an arc between the component and the element;
    (d) a controller operably controlling the welding head and determining weld quality based on the measured parameter by generating a measurement curve from the measuring, smoothing the measurement curve, creating a tolerance curve based on the smoothed measurement curve and detecting a difference between the tolerance curve and a smoothed measurement curve; and (e) an analyzer operable evaluating arc voltage and controlling the power supply.

36. The system of claim 35, wherein the element is a metal stud and the component is a metal sheet.

37. The system of claim 36, wherein the metal stud and the metal sheet are parts of a motor vehicle.

38. The system of claim 35, further comprising a user interface operably controlling the system.

39. The system of claim 38, wherein the user interface displays welding parameters.

40. The system of claim 35, further comprising an electric motor operably lifting and lowering the element.

41. The system of claim 35, wherein the system includes multiple welding heads.

42. The system of claim 35, wherein the element is arc welded to the component by the welding head.

43. The system of claim 35, further comprising an analysis device operably evaluating arc voltage and controlling power supply, based on feedback from arc voltage evaluation.

* * * * *